United States Patent [19]

Fukutani et al.

[11] Patent Number: 4,632,683
[45] Date of Patent: Dec. 30, 1986

[54] EXHAUST GAS PURIFYING FILTER AND PRODUCTION OF THE SAME

[75] Inventors: Masanori Fukutani, Nagoya; Naoto Miwa, Tsushima; Kazuyuki Ito, Nishio; Keiji Ito, Kariya, all of Japan

[73] Assignee: Nippondenso Co., Ltd., Kariya, Japan

[21] Appl. No.: 800,396

[22] Filed: Nov. 21, 1985

[30] Foreign Application Priority Data

Nov. 24, 1984 [JP] Japan ............................ 59-248498

[51] Int. Cl.$^4$ .............................................. B01D 39/20
[52] U.S. Cl. ............................... 55/523; 55/DIG. 30; 156/89; 264/63; 428/116
[58] Field of Search ......................... 55/523, DIG. 30; 156/89; 264/63; 428/116, 117

[56] References Cited

U.S. PATENT DOCUMENTS

| | | | |
|---|---|---|---|
| 4,253,992 | 3/1981 | Soejima et al. | 428/116 X |
| 4,264,346 | 4/1981 | Mann et al. | |
| 4,276,071 | 6/1981 | Ourland et al. | |
| 4,364,761 | 12/1982 | Berg et al. | 55/523 |
| 4,417,908 | 11/1983 | Pitcher | 55/523 |
| 4,464,185 | 8/1984 | Tomita et al. | |
| 4,568,402 | 2/1986 | Ogawa et al. | 156/89 |

FOREIGN PATENT DOCUMENTS 0042301 12/1981 European Pat. Off.

Primary Examiner—Charles Hart
Attorney, Agent, or Firm—Cushman, Darby & Cushman

[57] ABSTRACT

An exhaust gas purifying filter having a multiplicity of inward being open at the one axial end and blocked at the other axial end, a multiplicity of outward passages parallel to the axis of the filter, the outward passages being open at one axial end and blocked at the other axial end, and having porous partition walls placed between the inward passages and the outward passages and separating the inward passages and the outward passages from one another, which is characterized in that the surface of the partition wall exposed to at least the inward passage has superficial pores communicating with internal pores in the partition wall, the superficial pores being composed of small pores having a diameter of 5 to 40 μm and large pores having a diameter of 40 to 100 μm, the number of the small pores being 5 to 40 times that of said large pores and production of the same.

10 Claims, 12 Drawing Figures

EXHAUST GAS PURIFYING FILTER AND PRODUCTION OF THE SAME

BACKGROUND OF THE INVENTION

1. Field of the Invention

The present invention relates to an exhaust gas purifying filter which collects particulates composed mainly of carbon contained in the exhaust gas discharged from automotive and other internal combustion engines, whereby purifying the exhaust gas. More particularly, it relates to a structure of a ceramic exhaust gas purifying filter having the honeycomb structure, and to a process for producing the same.

2. Description of the Prior Art

Figure 9:
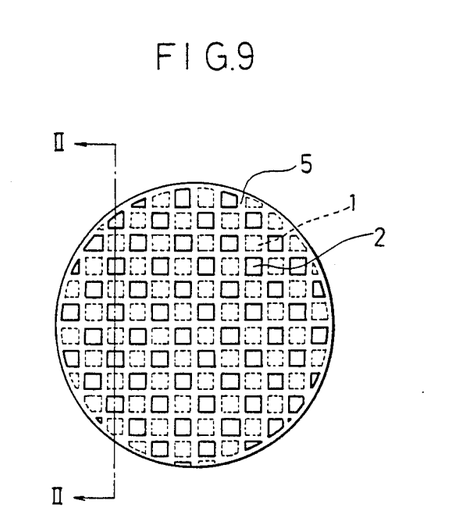
FIG. 9 is a schematic sectional view of a conventional exhaust gas purifying filter.
Figure 10:
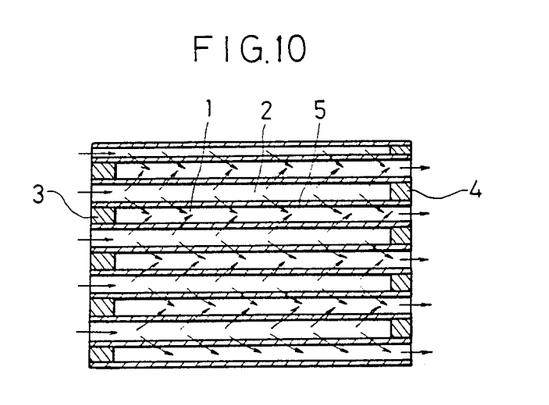
FIG. 10 is a sectional view taken in the direction of the arrows II—II.

A conventional cylindrical exhaust gas purifying filter having the honeycomb structure is shown in FIGS. 9 and 10. It has a plurality of passages (1, 2) which are separated from one another by partition walls (5). The openings of the passages are closed alternately checkerwise at end of the filter, and the other openings of the passages which are left open are closed at the other end of the filter. This exhaust gas purifying filter works as follows when attached to the exhaust system of an internal combustion engine. The exhaust gas enters the openings of the inward passages (2) arranged at one end of the filter. Since the inward passages (2) are blocked by the blocking material (4) at their opposite ends, the exhaust gas entering the inward passages (2) does not leave them straight, but pass through the pores in the porous partition walls (5) forming the section of the passages. Particulates in the exhaust gas are collected by the pores, and the purified exhaust gas passes through the outward passages (1) adjacent to the inward passages (2) and leaves their openings at the other end of the filter.

The exhaust gas purifying filter as mentioned above has been produced by, for example, the following method.

At first, a raw material for extrusion molding is prepared by mixing cordierite powder (prepared from talc, kaolin, alumina, etc.), methylcellulose (as a binder), water (or other fluids), and an additive to form pores. The mixing may be accomplished by using a kneader or the like. The raw material thus prepared is then formed by extrusion molding into a shape having a plurality of passages separated by latticed partition walls. The shape is dried by heating. The openings of the passages at one end of the shape are blocked alternately checerkwise with the above-mentioned mixed material. The openings of the passages at the other end of the shape are also blocked in the same manner. The shape thus prepared is dried and sintered at a proper temperature for a proper period of time. In this way, the exhaust gas purifying filter having the honeycomb structure as shown in FIGS. 9 and 10 is obtained.

The additive to form pores includes those substances such as iron powder, copper powder, and nickel powder which melt to form a liquid phase at a temperature lower than the sintering temperature of the above-mentioned mixed material, or those substances such as carbon and wax which burn or volatilize upon sintering. The pore size of the partition walls is adjusted as desired by changing the particle size of those substances and kind of the additive.

The conventional exhaust gas purifying filter as mentioned above is restricted in its performance by two factors—the efficiency in collecting particulates and the pressure loss of the exhaust gas passing through the filter. In order to optimize these contradictory characteristics, the pore diameter and the pore volume in the partition walls are designed according to the conditions under which the exhaust gas purifying filter is used. In the case of exhaust gas purifying filter disclosed in, for example, Japanese Patent Laid-open No. 70814/1983, this problem is solved by forming through-holes that connect both sides of the partition wall, whereby reducing the pressure loss at a small sacrifice of collection efficiency.

In the case of the above-mentioned exhaust gas purifying filter, the collecting efficiency is dependent on the length of time of use. In other words, the collecting efficiency is low at the beginning of a new filter, but it increases with time because particulates accumulate on the surface and pores of the partition wall. Then, the collecting efficiency reaches a constant level which is determined by the pore diameter and pore volume of the partition wall. Therefore, in the case of a new or regenerated exhaust gas purifying filter, the collecting efficiency in a certain period of time after the start of use is one half to one-third of the ultimate one. This leads to a trouble that the filter emits an exhaust gas containing a large amount of particulates in that period. This trouble may be eliminated if we use a filter having as small a pore diameter as particulates to be collected. On the other hand, such a filter causes pressure loss to increase sharply with time, decreasing its life.

SUMMARY OF THE INVENTION

It is an object of this invention to provide an exhaust gas purifying filter which keeps a high level of collecting efficiency regardless of the time of use.

This object has been attained by the filter which comprises the surface of the partition wall exposed to at least the inward passage has superficial pores being composed of small pores having a diameter of 5 to 40 $\mu$m and large pores having a diameter of 40 to 100 $\mu$m, the number of the small pores being 5 to 40 times that of the large pores.

Another object of this invention is to provide a process for producing above mentioned exhaust gas purifying filter.

In a process for producing an exhaust gas purifying filter which comprises forming by extrusion molding a raw material powder for ceramics into a shape of honeycomb structure having a multiplicity of passages parallel to the axis and separated by partition walls from one another, and heating the shape to give a ceramic body having porous partition walls, the improvement comprises incorporating the raw material with a blowing agent which expands upon heating to form pores having a pore diameter of 5 to 40 $\mu$m on and in the partition walls and an additive which forms pores having a pore diameter of 40 to 100 $\mu$m on and in the partition walls.

DETAILED DESCRIPTION OF THE PRESENT INVENTION

The exhaust gas purifying filter of this invention may fundamentally have the same honeycomb structure as the conventional one. That is, there are a multiplicity of openings of inward passages at the front end of the filter into which an exhaust gas is introduced. The inward passages are blocked at the rear end of the filter from which the purified exhaust gas is discharged. There are a multiplicity of openings of outward passages at the rear end of the filter from which the purified gas is discharged. The outward passages are blocked at the front end of the filter into which an exhaust gas is introduced. It is desirable that the inward passages and outward passages are formed parallel to the axis of the filter and are adjacent to one another through a partition wall. In other words, it is desirable that the openings and closings at each end are arranged alternately checkerwise. However, the invention is not limited to such an arrangement. According to this invention, the external appearance and size of filter and the number of passages are not specifically limited; but they may be selected as desired according to the object and application, as in the conventional ones. The cross section of the passage may be a circle, triangle, square, hexagon, etc. The thickness of the blocking is not critical; and it may be 2 to 10 mm, as in the conventional ones.

The most important feature of this invention consists in the pore structure of the partition walls that form and separate the inward passages and outward passages. There are superficial pores on the surface of the partition walls of the exhaust gas purifying filter of this invention, said superficial pores being composed of small pores having a diameter of 5 to 40 μm and large pores having a diameter of 40 to 100 μm. In addition, the number of the small pores is 5 to 40 times that of the large pores. The small pores mainly contribute to collecting efficiency in the initial stage of use, and the large pores mainly contribute to lowering the pressure loss because if particulates accumulate on the large pores, the diameter of the large pores are large enough. If the number of the small pores is less than 5 times that of the large pores, the filter is poor in collecting efficiency in the initial stage of use. Conversely, if it is greater than 40 times, the pressure loss increases and the strength as an exhaust gas purifying filter gets down.

The superficial pores communicate with the internal pores in the partition wall, and hence they communicate with the superficial pores on the opposite surface of the partition wall. This arrangement, therefore, permits an exhaust gas introduced into the inward passage to pass through the superficial pores on the surface of the partition wall exposed to the inward passage and to be discharged from the superficial pores on the surface of the partition wall exposed to the outward passage, so that the purified exhaust gas is finally discharged through the outward passages.

The openings of the superficial pores should preferably account for 20 to 60% of the surface area of the partition wall having the superficial pores. If this area is less than 20%, the pressure loss increases; and if this area is greater than 60%, the collecting efficiency decreases and such a filter is poor in strength.

Figure 4:
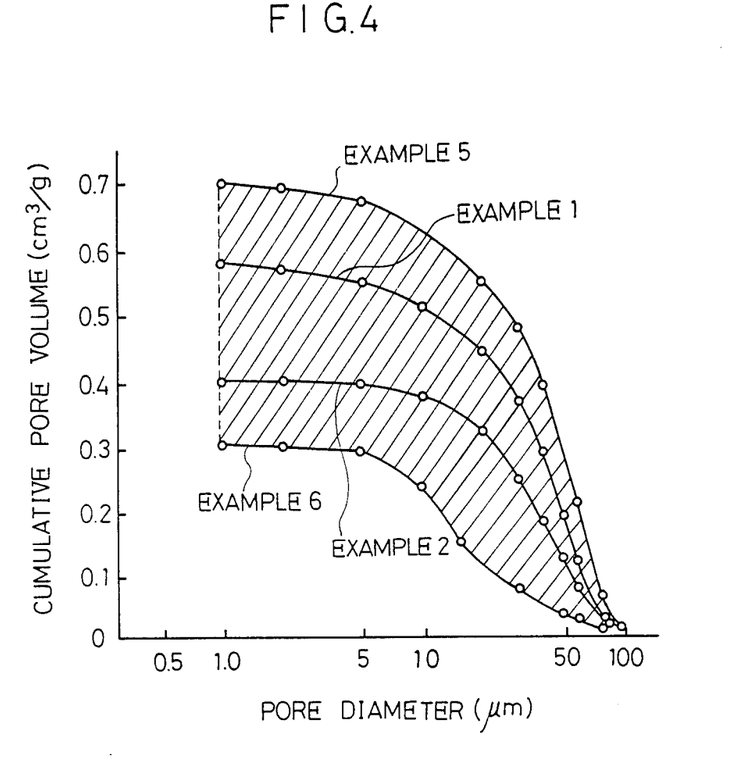
FIG. 4 is a diagram showing the relationship between the pore diameter and the cumlative pore volume of the internal pores in the partition walls of the exhaust gas purifying filter of this invention.

The internal pores should preferably have a cumulative pore volume of 0.3 to 0.7 $cm^3/g$, and the pore diameter and the pore volume should preferably have the distribution as shown in FIG. 4. The cumulative pore volume is the sum of the pore volumes measured by mercury porosimetry for different pore diameters. If the cumulative pore volume is smaller than 0.3 $cm^3/g$ or the pore volume for each pore diameter is lower than the range shown in FIG. 4, the filter has a high pressure loss; and if it is greater than 0.7 $cm^3/g$ or the pore volume for each pore diameter is higher than the range shown in FIG. 4, the filter is poor in strength and collecting efficiency, although pressure loss decreases to some extent. The thickness of the partition wall should preferably be 200 to 650 μm. With a thickness smaller than the lower limit, the filter is poor in strength, and with a thickness greater than the upper limit, pressure loss is high.

The second invention disclosed herein is a process for producing the above-mentioned exhaust gas purifying filter.

The raw material used for the process of this invention may be any powder that forms the ceramic body. For example, it is cordierite, a mixture of talc, silica, kaolin, alumina, and aluminum hydroxide that gives a cordierite composition upon sintering, alumina, mullite, spodumene, aluminum titanate, eucryptite, silicon carbide, and silicon nitride. They may be used individually or in combination with one another.

The additive that forms the internal pores and the superficial pores having a pore diameter greater than 40 m is a metal powder such as iron powder, copper powder, and nickel powder which melts to form a liquid phase at a temperature below the sintering temperature of the raw material powder for ceramics, or a substance such as carbon or wax that burns or volatilizes upon heating. The kind, particle size, and amount of the additive are properly selected according to the raw material powder used and the desired performance of the exhaust gas purifying filter. The particle size of the additive should preferably be 1 to 150 μm and the amount of the additive should preferably be 0.3 to 25 wt%.

The above-mentioned raw material powder is usually incorporated with a binder to prevent the extruded shape from breaking. The binder includes, for example, methylcellulose, carboxymethyl cellulose, ammonium alginate, and polyvinyl alcohol, which have been commonly used in the past. The raw material powder may further be incorporated with a lubricant such as glycerin and other additives.

Furthermore, the raw material powder is incorporated with a blowing agent that constitutes the feature of this invention. This blowing agent includes any substance that expands several times its original volume upon heating, and it also includes any hollow objects made of a substance that burns at a temperature below the sintering temperature of the raw material. Examples of such hollow objects include microspheres of thermoplastic resin containing butane gas. The blowing agent should expand while the molded shape is still in the plastic state, as mentioned later. Therefore, the preferred blowing agent is one which expands at a temperature much lower than the sintering temperature, desirably at a temperature below the boiling point of the liquid used for kneading (or below 100° C. where the liquid is water). The blowing agent also includes a bicarbonate which is a solid at normal temperature and evolves a gas upon thermal decomposition. However, such a blowing agent may not perform the desired foaming, because the particles of the raw materials and blowing agent are simply connected by a binder and the gas evolved from the blowing agent escapes from the gaps between the particles. The above-mentioned microspheres are desirable because the shells expand to some extent while holding the gas therein and provide bubbles of approximately uniform volume. The foaming means not only the evolution of a gas and the expansion of the gas thus evolved, but also the formation of spaces by the burning of shells of hollow objects.

The amount of the above-mentioned blowing agent should preferably be 0.3 to 5.0 wt% in the above-mentioned raw materials. With less than 0.3 wt%, the blowing agent does not produce any good result; and if the amount exceeds 5 wt%, the sintered filter has a low strength with cracking. The above-mentioned blowing agent microspheres should have a diameter of 5 to 50 $\mu$m, preferably 10 to 20 $\mu$m, as measured before expansion. If this diameter is excessively large, the resulting exhaust gas purifying filter is poor in collecting efficiency in the initial period; and if the diameter is exessively small, the blowing agent does not provide sufficient foaming and hence desired pores, and the resulting exhaust gas purifying filter is poor in collecting efficiency in the initial period.

The above-mentioned blowing agent provides pores having a diameter of 5 to 40 $\mu$m on and in the partition walls of the exhaust gas purifying filter. Several pores having a diameter of 5 to 40 $\mu$m on and in the partition walls are combined each other and combined by the pores provided by the above-mentioned additives. Then it also provides some pores having a diameter of 40 to 100 $\mu$m.

The production process will be described below in the order of steps.

The extrusion molding step used in this invention includes mixing the raw material powder and water (or other liquid) by a kneader, extruding the mixture into a shape of honeycomb structure by a honeycomb extrusion molding machine, and cutting the extrudate to a desired length. The shape of honeycomb structure has many passages parallel to the axis and separated by partition walls from one another, as in the conventional one. The cross section of the passages may be a square, regular triangle, circle, etc.

The heating step in this invention includes drying the extruded shape for evaporation of water (drying step) and sintering the extruded shape for the bonding of raw material powder (sintering step).

The drying step denotes the step of evaporating water (or other liquid) used at the time of mixing. In the case where water is used for mixing, the drying step is accomplished by keeping the extruded shape at 80° to 100° C. for a proper period of time according to the size of the extruded shape. The sintering step denotes the step of sintering the raw materials. In the case where cordierite is used, the sintering step is accomplished by keeping the extruded shape at 1300° to 1450° C. for 5 to 6 hours, as with the conventional one. During the sintering process, pores are formed on the surface of the extruded shape and in the extruded shape by a substance that forms a liquid phase at a temperature below the sintering temperature or by a substance like carbon which burns or volatilizes. The drying step and the sintering step may be performed separately or consecutively. In the former case, the extruded shape is cooled between the two steps; and in the latter case, the temperature is continuously raised.

The blowing agent that constitutes the feature of this invention should preferably expand in the drying step. This is because the extruded shape is still capable of plastic deformation in the drying step and the stress generated by foaming is absorbed by plastic deformation which prevents cracking.

Where the drying step and sintering step are performed continuously, the heating rate and heating time should be properly adjusted so that the blowing agent expands completely while the extruded shape is still capable of plastic deformation. The expansion of the blowing agent forms pores or cells on the surface of the partition walls of the extruded shape. Thus there are formed pores having a diameter of 5 to 40 $\mu$m by sintering. Needless to say, the similar pores are also formed in the partition walls.

The openings of the passages in honeycomb structure are preferably closed alternately checkerwise in order to increase the collecting efficiency. In other words, the inward passages are left open at the front end and closed at the rear end; and the outward passages are closed at the front end and left open at the rear end. The inward passages are adjacent to the outward passages through the partition walls.

The openings of the passages may be closed with the same mixture of raw materials as used for making the extruded shape. The blocking may be performed before or after sintering. (In the latter case, sintering should be repeated for the blocking material.) The blocking material is nor required to have pores; but pores can be made in the same manner as mentioned above.

The exhaust gas purifying filter, which is the first invention disclosed herein, can be produced most efficiency by the process mentioned above.

The exhaust gas purifying filter of this invention is characterized by the distribution of pore diameters of superficial pores. The superificial pores are composed of small pores having a diameter of 5 to 40 m and lage pores having a diameter of 40 to 100 $\mu$m. And the number of small pores are 5 to 40 times that of the large pores. The small pores mainly contribute to collecting efficiency in the initial stage of use, and the large pores mainly contribute to lowering the pressure loss. Because of this unique distribution, the filter of this invention exhibits a high collecting efficiency even in the initial stage of operation. Moreover, it keeps the pressure loss at a low level. Thus the filter of this invention does not emit an exhaust gas containing a large amount of particulates in the initial stage of operation, and the pressure loss that increases with time can be maintained as low as the conventional one.

According to the process of this invention, the unique distribution of superficial pores is achieved by adding a blowing agent and additives such as metal powder and carbon. This makes it possible to obtain the desired pore distribution simply by controlling the composition of the raw materials, and a number of process does not increase.

The blowing agent used in this invention also forms the internal pores in the partition walls. Therefore, according to the process of this invention, it is possible to reduce the amount of additives such as carbon powder. This eliminates the troubles caused by the drop of melting point that takes place when impurities such as carbon powder are added in large amounts.

EXAMPLES

The invention is now illustrated with the following examples, in which quantities are expressed as parts by weight.

The first series of examples

EXAMPLE 1

Figure 3:
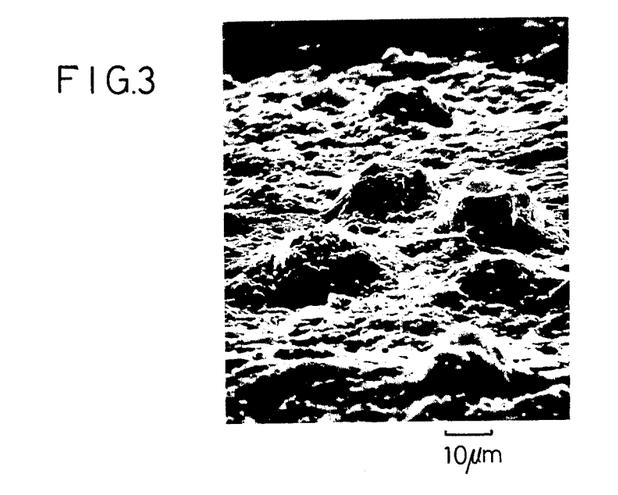
FIG. 3 is a perspective electron micrographs showing the surface structure of the partition wall of the exhaust gas purifying, taken after drying.

36.8 parts of talc, 44.4 parts of aluminum hydroxide, 18.8 parts of fused silica, 25 parts of carbon powder, 9 parts of methylcellulose (as a binder), and 1.5 parts of microspheres of thermoplastic resin containing butane gas ("Matsumoto microsphere" made by Matsumoto Yushi Seiyaku Co., Ltd., having a particle diameter of 10 to 20 $\mu$m) were dry blended for 10 minutes by a kneader. The resulting mixture was mixed with 30 parts of water and 4 parts of glycerin (as a lubricant). The resulting mixture was extruded by a known honeycomb extrusion molding machine, and the extrudate was cut to a desired length. The extruded shape was dried in an electronic oven to evaporate more than 80% of water. The extruded shape was further dried by hot air at 80° C. for 3 hours. At this stage, the surface of the partition wall was observed under an electron microscope. The electron micrograph is shown in FIG. 3. It is noted that small projections, 10 to 30 $\mu$m in diameter, were formed on the surface of the partition wall. These projections resulted from expansion of the blowing agent.

After drying, the extruded shape was sintered at 1400° C. for 20 hours. Thus there was obtained a honeycomb body of cordierite.

Both ends of the honeycomb body were covered with a 0.6 mm thick wax sheet. Using a special jig, the wax sheet on one end was pushed inside 7 mm from the end face so that the individual wax sheets covering the passages and the other individual wax sheets pushed inside all together form a checkered pattern. The same procedure was repeated for the other end except that the checked pattern was reversed. A blocking material formed by mixing 36.8 parts of talc, 44.4 parts of aluminum hydroxide, 18.8 parts of fused silica, and 50 parts of water was filled into the passages in which the wax sheet had been pushed. The honeycomb body was sintered again at 1400 C. for 5 hours to burn up the wax and bond the blocking material to the partition walls. Thus there was obtained a cylindrical exhaust gas purifying filter of Example 1, 117 mm in outside diameter, 130 mm long, having 200 passages per square inch and a partition wall thickness of 0.3 mm.

Figure 1:
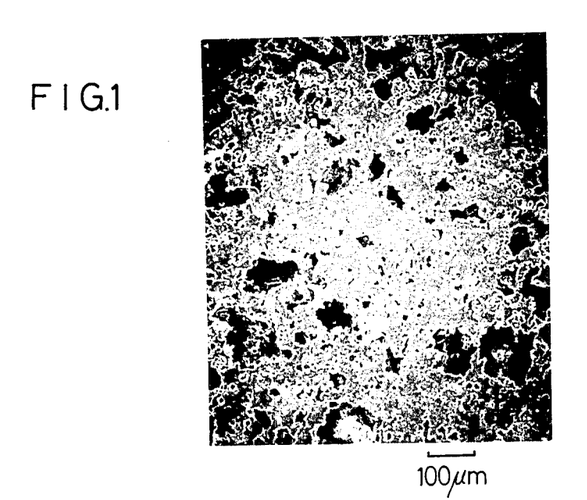
FIG. 1 is an electron micrograph showing the surface structure of the partition wall of the exhaust gas purifying filter of example 1, taken after sintering.
Figure 2:
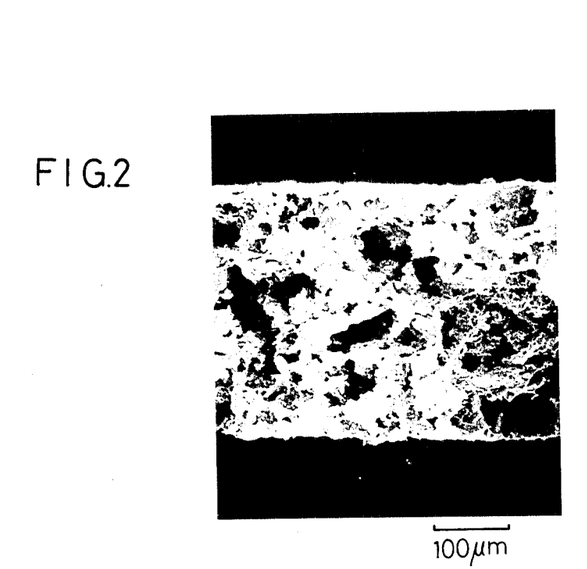
FIG. 2 is an electron micrograph showing the sectional structure of the partition wall of the exhaust gas purifying filter of example 1, taken after sintering.

FIG. 1 is an electron micrograph of the surface of the partition wall, and FIG. 2 is an electron micrograph of the cross-section of the partition wall. It is noted from FIG. 1 that small pores, 5 to 40 $\mu$m in diameter, and large pores, 40 to 100 $\mu$m in diameter, are uniformly distributed on the surface of the partition wall, and the ratio of the number of small pores to the number of large pores is about 15:1. The diameter as used herein means the maximum dimension of each pore and the ratio is an average number obtained by the observation of an electron micrograph. It is noted from FIG. 2 that there are pores of varied diameters in the partitional wall. FIG. 4 shows the distribution of pores in the partition wall measured by mercury porosimetry. The average pore diameter was 40 $\mu$m and the cumulative pore volume was 0.58 cm$^3$/g.

EXAMPLE 2 TO 5

Exhaust gas purifying filter of Examples 2 to 5 were prepared in the same manner as in Example 1 except that the amount of the blowing agent was changed to 0.3 parts, 1.0 part, 3.0 parts and 5.0 parts, respectively.

CONVENTIONAL EXAMPLE 1

Figure 11:
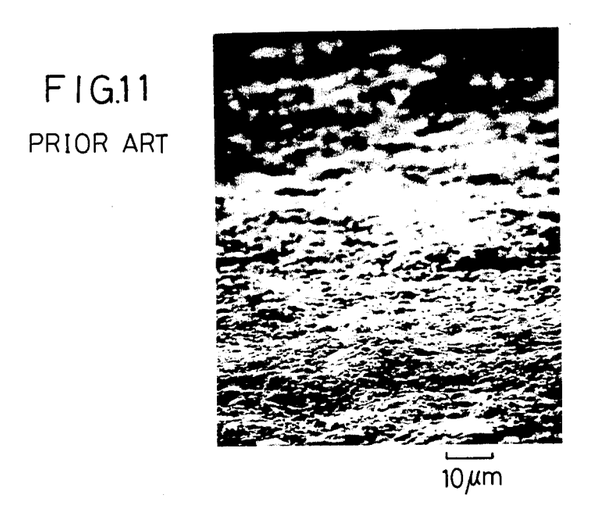
FIG. 11 is a perspective electron micrograph showing the surface structure of the partition wall of the exhaust gas purifying filter of conventional example 1.
Figure 12:
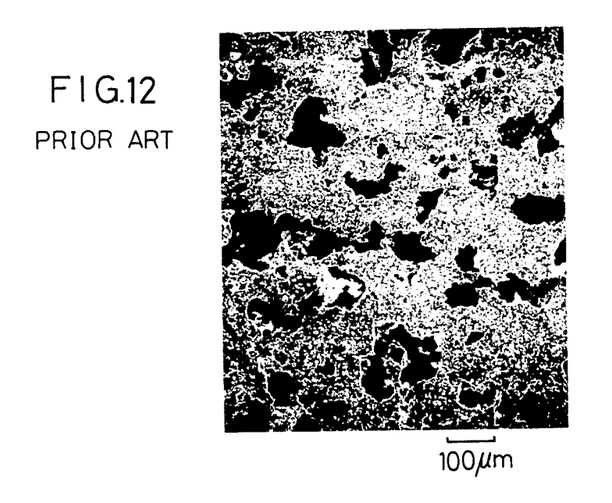
FIG. 12 is an electron micrograph showing the surface structure of the partition wall of the exhaust gas purifying filter of conventional example 1.

On the other hand, an exhaust gas purifying filter of Conventional Example 1 was prepared in the same manner as in Example 1 except that the blowing agent was not used. The surface of the partition wall after drying and after sintering was observed under an electron microscope. The electron micrographs are shown in FIGS. 11 and 12, respectively. It is noted from FIG. 11 that, unlike 1 as shown in FIG. 3, there are no projection on the surface of the partition wall after drying. Also it is noted from FIG. 12 that there are pores, about 40 to 100 $\mu$m in diameter, on the surface of the partition wall after sintering, but there are only a few pores, 5 to 40 $\mu$m in diameter, unlike FIG. 1.

The exhaust gas purifying filters of Examples 2 to 5 and Conventional Example 1 were examined for the ratio of the number of small pores to the number of large pores on the surface by observation under an electron microscope as in Example 1. The results are shown in Table 1. The exhaust gas purifying filter of Examples 2 and 4 were examined for the distribution of the internal pores by mercury porosimetly as in Example 1. The results are shown in FIG. 4.

TABLE 1

| Example No. | The ratio of "Number of small pores (5 to 40 $\mu$m)" to "Number of large pores (40 to 100 $\mu$m)" | Amount of blowing agent added (parts) |
|---|---|---|
| Example 1 | 15:1 | 1.5 |
| Example 2 | 5:1 | 0.3 |
| Example 3 | 10:1 | 1.0 |
| Example 4 | 30:1 | 3.0 |
| Example 5 | 40:1 | 5.0 |
| Conventional Example 1 | 1:1 | — |

TEST EXAMPLES

Figure 5:
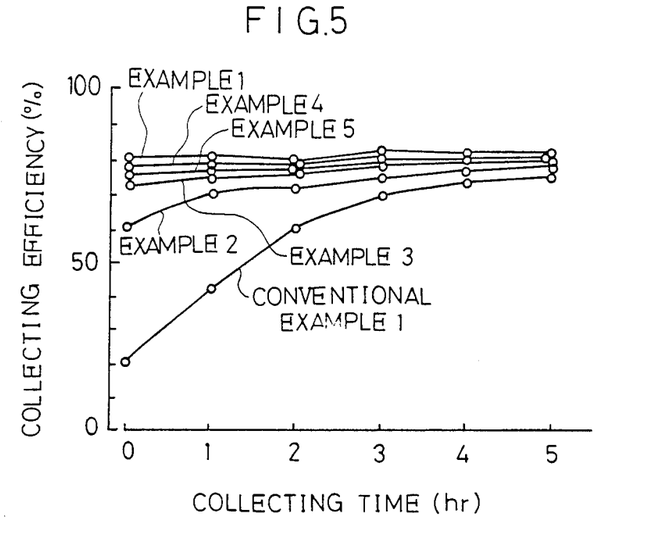
FIGS. 5 and 7 are graphs showing the relationship between the collecting efficiency and the collecting time.
Figure 6:
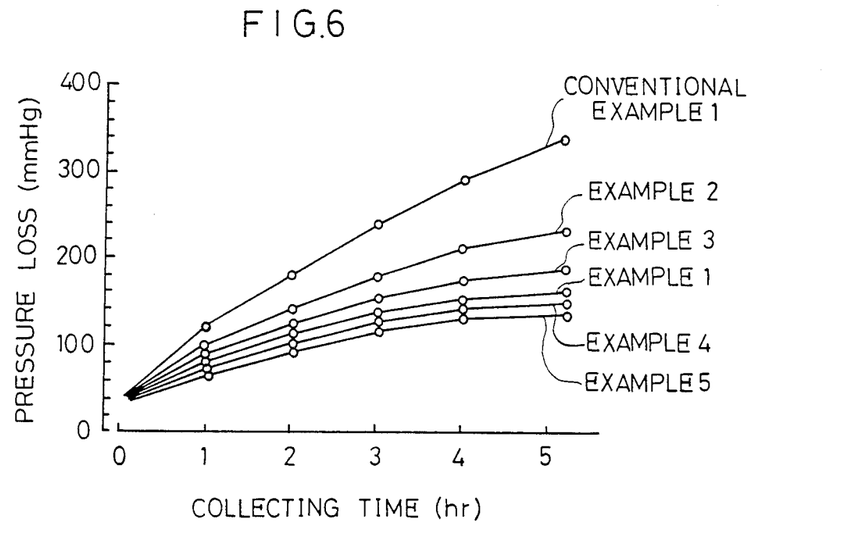
FIGS. 6 and 8 are graph showing the relationship between the pressure loss and the collecting time.

The exhaust gas purifying filters prepared in the above-mentioned Examples and Conventional Example 1 were tested for the collecting efficiency and pressure loss. Each sample was connected to the exhaust system of a 2200 cc diesel engine running at 2000 rpm under a load of 6 kgf·m. The temperature of the exhaust gas marked 300° C. at the inlet of the filter. The results are shown in FIG. 5 and FIG. 6. It is noted from FIG. 5 that the collecting efficiency is kept constant regardless of length of the collecting time, with the initial one being higher than 60%, in the case of Examples 1 to 5 in which the number of small superficial pores is greater than five times that of large superifical pores. The collecting efficiency ($\eta$) is defined as follows.

$$\eta(\%) = \frac{W_1 - W_2}{W_1} \times 100$$

$W_1$: weight of particulates which enter the filter
$W_2$: weight of particulates which is passed through the filter It is noted from FIG. 6 that the pressure loss measured 5 hours after the start of collecting was lower than about 230 mmHg in the case of Example 1 to 5. On the other hand, in the case of Conventional Example 1, the initial collecting efficiency was 20% and the pressure loss measured after 5 hours was 330 mmHg. Apparently, the difference in performance is attributable to the distribution of superficial pores and internal pores.

THE SECOND SERIES OF EXAMPLES

The process of this invention was applied to the exhaust gas purifying filter which is similar in structure to that in Example 1 but is designed to have a comparatively low collecting efficiency. This filter has such a structure that the partition walls separating the inward passages and the outward passages are provided with through-holes that connect both passages to each other, as disclosed in Japanese Patent Laid-open No. 70814/1983.

39.3 parts of talc, 45.6 parts of kaolin, 15.1 parts of alumina, 10 parts of carbon powder, 6 parts of methylcellulose, 3.7 parts of iron powder having a particle diameter of 44 to 149 $\mu$m, and 1.5 parts of the same blowing agent as used in Example 1 were dry blended for 10 minutes by a kneader. The resuslting mixture was mixed with 27 parts of water and 3 parts of glycerin. The resulting mixture was extruded and cut to a prescribed length in the same manner as an Example 1. After drying, the extruded shape was sintered at 1380° C. for 10 hours. Thus there was obtained a honeycomb body.

Both ends of the honeycomb body were blocked with the same material and in the same manner as in Example 1, followed by sintering. Thus there was obtained an exhaust gas purifying filter of Example 6 which has the same configuration as that in the first series of examples.

Upon examination with an electron microscope, it was found that there are small superficial pores, 5 to 40 $\mu$m in diameter, and large superficial pores, 40 to 100 $\mu$m, on the surface of the partition walls. The number of the small pores was 20 times that of the large pores. In addition, there are through-holes, 100 to 250 m in diameter, that pass through from one surface of the partition wall to the other. They are formed by the lowering of melting point induced by iron powder in the raw material. As with the first series of example, the pore size distribution of internal pores in the partition wall was measured by mercury porosimetry. The average pore diameter was 15 $\mu$m and the cumulative pore volume was 0.3 cm$^3$/g. The pore size distribution is shown in FIG. 4.

On the other hand, an exhaust gas purifying filter of Conventional Example 2 was prepared in the same manner as in Example 6 except that the blowing agent was not used. It was found that there are small superficial pores, 5 to 40 $\mu$m in diameter, and large superficial pores, 40 to 100 $\mu$m, on the surface of the partition walls. The number of the small pores was 3 times that of the large pores. In addition, there are as many through-holes, 100 to 250 $\mu$m in diameter, as the large pores. The pore size distribution of internal pores in the partition wall was measured. The average pore diameter was 13 $\mu$m and the cumulative pore volume was 0.25 cm$^3$/g.

Figure 7:
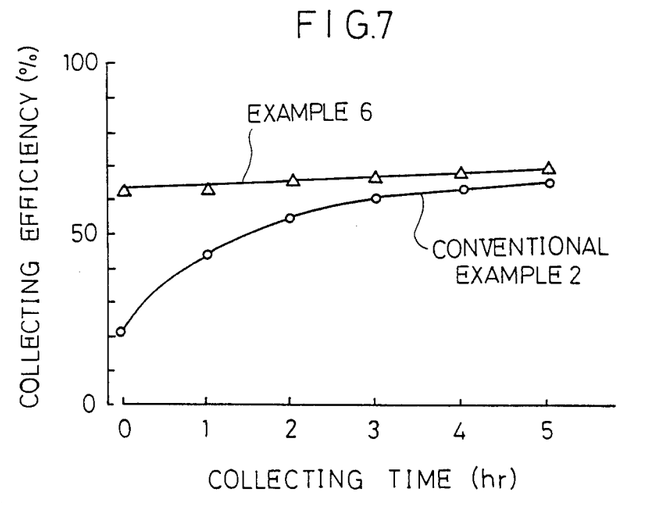
Figure 8:
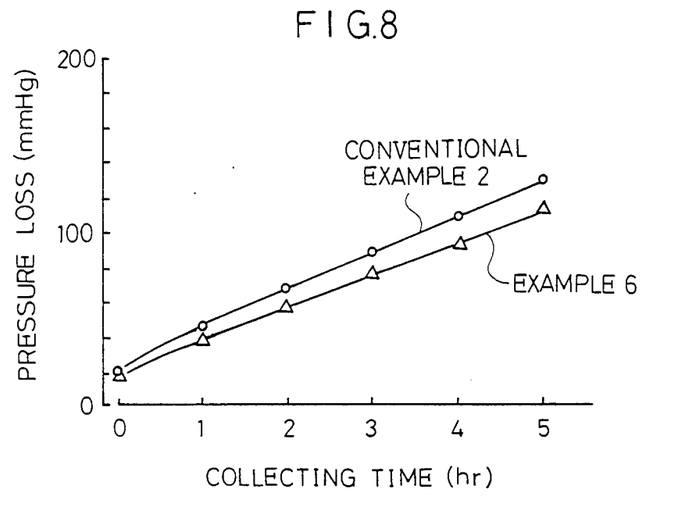

The exhaust gas purifying filters prepared in the above-mentioned Example 6 and Conventional Example 2 were tested for collecting efficiency and pressure loss in the same manner as in the first series of examples. The results are shown in FIG. 7 and FIG. 8. It is noted from FIG. 7 that the initial collecting efficiency in Example 6 is several times greater than that in Conventional Example 2, and the pressure loss in Example 6 is almost the same as that in conventional Example 2. Apparently, this is attributable to the distribution of superficial pores and internal pores. Pressure loss in Example 6 is lower than that in Example 1 although the average particle diameter and cumulative pore volume in the partition walls in Example 6 are smaller than those in Example 1. This is attributable to the presence of through-holes.

What is claimed is:

1. An exhaust gas purifying filter having a multiplicity of inward passages parallel to the axis of the filter in which said inward passages being open at the one axial end and blocked at the other axial end, a multiplicity of outward passages parallel to the axis of the filter in which said outward passages being open at one axial end and blocked at the other axial end, and having porous partition walls placed between said inward passages and said outward passages and separating said inward passages and said outward passages from one another,
   which comprises the surface of said partition wall exposed to at least the inward passage has superficial pores communicating with internal pores in said partition wall, said superficial pores being composed of small pores having a diameter of 5 to 40 $\mu$m and large pores having a diameter of 40 to 100 $\mu$m, the number of said small pores being 5 to 40 times that of said large pores.

2. An exhaust gas purifying filter according to claim 1,
   wherein the area of the opening of said superficial pores on the surface of the partition wall accounts for 20 to 60 of the total area of the partition wall.

3. An exhaust gas purifying filter according to claim 1,
   wherein said internal pores in the partition wall has a cumulative pore volume of 0.3 to 0.7 cm$^3$/g.

4. An exhaust gas purifying filter according to claim 1,
   wherein said internal pores have the distribution of pore volumes as indicated by the hatched part in FIG. 4.

5. In a process for producing an exhaust gas purifying filter which comprises the steps;
   forming by extrusion molding a raw material powder for ceramics into a shape of honeycomb structure having a multiplicity of passages parallel to the axis and separated by partition walls from one another; and
   heating said shape to give a ceramic body having porous partition walls,
   wherein said raw material being incorporated with a blowing agent which expands upon heating to form pores having a pore diameter of 5 L to 40 μm on and in of the partition walls and an additive which forms pores having a pore diameter of 40 to 100 82 m on and in the portion walls.

6. A process for producing an exhaust gas purifying filter according to claim 5,
wherein said passages are made up of inward passages, with their ends open at the front end of the filter and their another ends closed at the rear end of the filter outward passages, with their ends closed at the front end of the filter and their another ends open at the rear end of the filter, said inward passages and outward passages being adjoining to each other through the portion walls.

7. A process for producing an exhaust gas purifying filter according to claim 5,
wherein said blowing agent is contained in an amount of 0.3 to 5 wt% in the raw materials.

8. A process for producing an exhaust gas purifying filter according to claim 5,
wherein said blowing agent is an organic blowing agent that expands under 100° C.

9. A process for producing an exhaust gas purifying filter according to claim 5,
wherein said blowing agent is in the particulate form having a particle diameter of 5 to 20 μm.

10. A process for producing an exhaust gas purifying filter according to claim 5,
wherein said additive has a particle size of 1 to 150 μm and is contained in an amount of 0.3 to 25 wt% in the raw materials.

* * * * *